Patented Mar. 4, 1924.

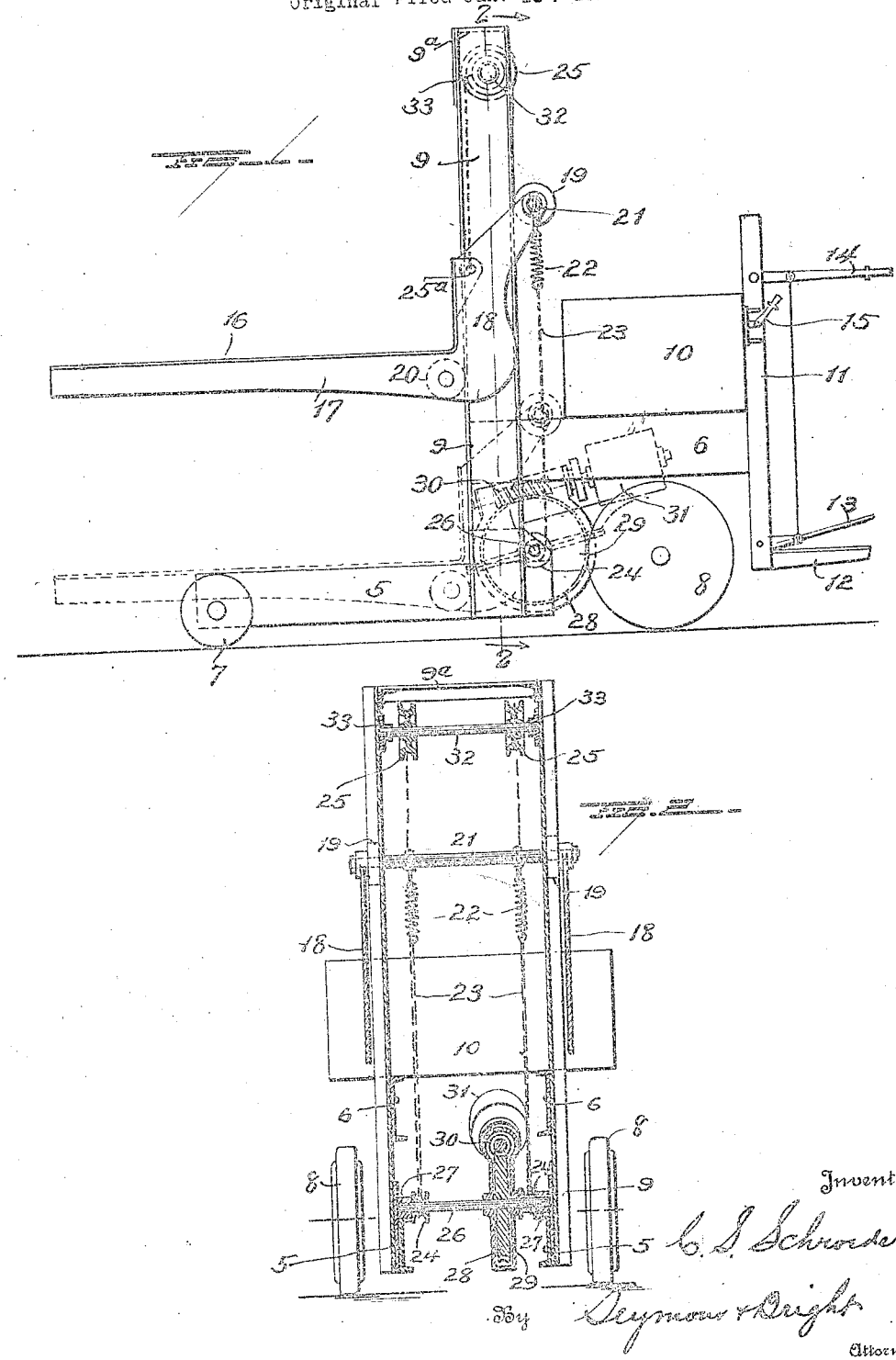

1,485,817

UNITED STATES PATENT OFFICE.

CHARLES S. SCHROEDER, OF STAMFORD, CONNECTICUT, ASSIGNOR TO THE YALE & TOWNE MANUFACTURING COMPANY, OF STAMFORD, CONNECTICUT.

INDUSTRIAL TRUCK.

Application filed January 18, 1921, Serial No. 438,084. Renewed October 24, 1923.

*To all whom it may concern:*

Be it known that I, CHARLES S. SCHROEDER, a citizen of the United States, and a resident of Stamford, in the county of Fairfield and State of Connecticut, have invented certain new and useful Improvements in Industrial Trucks; and I do hereby declare the following to be a full, clear, and exact description of the invention, such as will enable others skilled in the art to which it appertains to make and use the same.

This invention relates to wheeled elevating devices, and more particularly to elevating trucks adapted for use in warehouses, railroad stations, etc., the object being to produce a simple efficient construction possessing various advantages over the trucks now in use.

With this object in view my invention consists in a drop frame truck mounted on wheels, two of which are driving steering wheels, the frame being provided with vertical column guides which support the elevating platform which is raised and lowered by flexible supporting means actuated by a motor.

It further consists in a truck the elevating platform of which is adapted to be loaded with any material or articles of weight not exceeding the capacity of the machine and to readily transport, elevate, lower or deposit said material or articles in a location and on any relative level within the range of the machine and at the will of the operator, the elevating means including yielding means for taking up the slack in the supporting means.

My invention further consists in the details of construction as will be more fully explained and pointed out in the claims.

In the accompanying drawings: Figure 1 is a view in side elevation of a truck embodying my invention and Figure 2 is a view in section on the line 2—2.

5 and 6 represent the truck frame members mounted respectively on the wheels 7 and 8, the latter of which are driven by a motor or motors and mounted to turn for steering in any of the well known manners.

Secured to the frame members 5 adjacent one end of the latter are the parallel vertical guides or elevating platform supporting members 9 which are riveted at their lower ends to the frame 5 and connected at the top by the channel iron 9ª, and riveted to the guides 9 are the frame members 6, in a higher plane than the members 5 which frame 6 is supported and mounted in any approved manner on the driving and steering wheels 8.

The elevated member 6 of the truck frame constitutes a support for the storage battery 10, and the end frame or dash board 11 carries the platform 12 on which the operator stands and also forms a support for the brake pedal 13, steering handle 14 and reversing switch 15 all of which are within convenient reach of the operator standing on the platform 12.

16 is the elevating platform the side flanges 17 of which are in planes outside of the members 5 of the truck, so that when the platform 16 is in its lowermost position it will rest on the truck frame 5, with its side arms or flanges 17 overhanging the sides of the latter and if desired projecting beyond its free end as shown in dotted lines in Figure 1.

Integral with the side members or flanges 17 of the elevating platform 16, are the upwardly extending arms 18, one on each side of the elevator, which arms extend upwardly at the outer sides of the column guides 9 and terminate in front of the latter, the said free ends carrying a shaft with rollers 19 thereon which bear against the front faces of the two column guides 9 and operate to support the platform 16 in its horizontal position. The side frames or flanges 17 are provided in a plane below the rollers 19 and at the rear of the column guides 9 with the rollers 20 which latter bear against the rear edges of the latter in a horizontal plane below the rollers 19. The rollers 19 and 20 embracing and bearing against the opposite sides of the column guides, operate to hold the elevating platform 16 in a horizontal position, and prevent frictional contact between the latter and the vertical column guides.

The forward ends of the arms 17 of the elevating platform 16 terminate in front of the vertical guides 9 and are connected by the shaft 21 which carries the rollers 19 as above explained. This shaft is preferably fixed to the extensions 18 and the rollers 19 are journalled on the shaft, and as previously explained bear against the front face of the vertical columns 9.

22 are suitable springs each secured at its upper end to shaft 21 and at its lower end to a chain or cable, preferably chain 23 as shown, each of which latter passes downwardly around a pocket sheave 24, up and around idler sheaves 25 located near the tops of the vertical guides and then down to the extension 18 of the elevating platform 16 and are secured to the inwardly turned flanges 25ᵃ of the latter, the said flanges being at the inner sides of the vertical columns while the extensions 18 are preferably at the outer sides.

As shown in Figure 2 the pocket sheaves which positively actuate the chains are secured to shaft 26 journalled at its ends in the bearings 27 which are secured to the truck frame and preferably to the vertical guide 9 carried by the said frame.

Secured to shaft 26 is the worm wheel 28 which is covered by the housing 29 and preferably submerged in oil. This wheel 28 meshes with the worm 30 actuated by the electric motor 31 connected with the storage battery 10, the motor and chain driving mechanism being located below the elevated portion 6 of the truck frame.

The idler pulleys 25 may be secured to or journalled on the shaft 32 secured or mounted at its ends in the bearings 33 secured to the inner faces of the vertical guides 9 near the top of the latter.

These guides may be of any height desired to provide for any desired lift of the platform, and the construction is such that the load on the platform is borne largely by the extensions 18 of the platform 16, the lifting and holding of the platform in its elevated position being of course accomplished by the chains.

With this construction, the interposition of the springs 22 take up any and all slack in the chain and constitute a flexible medium that tends to lessen the strain of road shock and other binding strains that would develop in a rigid hoist operated on uneven ground. Again by applying a spring to the slack end of the chain, the latter is kept taut thus avoiding objectionable noise while the apparatus is moving from one point to another.

With this device, the elevating platform of the truck can be run under a loaded platform or other article that is mounted on legs or supports sufficiently high for the movable platform of the truck to be passed therein, or it can be used for elevating baggage to car platforms or storage stacks and for any of the numerous purposes which an elevating truck is now or may be used.

Having fully described my invention what I claim as new and desire to secure by Letters-Patent is:—

1. In a self propelled elevating truck, the combination of a frame having an operator's platform, storage battery and motor at one end thereof, vertical guides on said frame located intermediate the ends of the said frame, a movable platform located on the frame at the opposite end thereof, the said movable platform having extensions at one end, the said extensions having bearing against said guides at the front and rear of the latter, and flexible means the two ends of which are connected to the extensions.

2. In a self propelled elevating truck, the combination of a frame having an operator's platform, a storage battery and a motor at one end thereof, vertical guides secured to said frame intermediate the ends, a movable platform located at the opposite end and having upward extensions at its front end, rollers carried by said extensions and bearing respectively against the front and rear faces of the guides and flexible means actuated by the motor and connected at its two ends to the movable platform.

3. In an elevating truck, the combination of a truck frame mounted on wheels, vertical guides on said frame and located intermediate the ends thereof, a movable platform located at one end of said frame and having upwardly projecting extensions, rollers carried by the platform and said upward extensions and bearing respectively against the front and rear faces of the vertical guides, a flexible lifting means connected at both ends to the platform and a motor actuated driving means located at the opposite end of the frame and engaging said flexible lifting means intermediate the ends of the latter.

4. In an elevating truck, the combination of a frame mounted on wheels, vertical guides intermediate the ends of said frame, a movable platform located at one end of said frame and guided in its movements by said vertical guides, flexible lifting means connected at both of its ends to the platform and passing around pulleys adjacent the top and bottom of the guides, and motor actuated driving means located at the opposite end of said frame, and engaging said flexible lifting means intermediate the ends of the latter.

5. In an elevating truck, the combination of a frame mounted on wheels, vertical guides on said frame, a lifting platform guided in its movements by said vertical guides, flexible lifting means connected at both ends to said lifting platform, a spring constituting a part of said flexible means for taking up the slack in the same and motor driving means connected with said flexible means intermediate the ends of the latter for lifting the platform.

6. In an elevating truck, the combination of a frame mounted on wheels and provided intermediate its ends with vertical guides, a lifting platform located at one end of the frame and guided by said guides, and a motor and storage battery located at the opposite end of said frame, flexible means connected at one end to said platform, passing over sheaves adjacent the tops of the guides and under sheaves near the bottom and connected at its other ends to the platform, and means actuated by the motor and engaging said flexible means intermediate its ends for actuating the latter.

In testimony whereof, I have signed this specification in the presence of two subscribing witnesses.

CHARLES S. SCHROEDER.

Witnesses:
 R. W. CHANDLER,
 P. S. KEEFER.